United States Patent Office 3,657,325
Patented Apr. 18, 1972

3,657,325
ESTERS OF SUBSTITUTED GLYOXYLIC ACIDS
James E. Siggins, Bethlehem, N.Y., assignor to Sterling Drug Inc., New York, N.Y.
No Drawing. Continuation-in-part of application Ser. No. 613,457, Feb. 2, 1967. This application Dec. 3, 1969, Ser. No. 881,892
Int. Cl. C07c *69/66*
U.S. Cl. 260—483          4 Claims

ABSTRACT OF THE DISCLOSURE

The compounds are esters and amides of alkylglyoxylic and arylglyoxylic acids, prepared from the free acids and the appropriate substituted alcohol, amine or alkyl halide. The compounds are useful as plasticizers, and the members of a subgroup are useful as hypoglycemic agents.

---

This application is a continuation-in-part of my copending application Ser. No. 613,457, filed Feb. 2, 1967, now U.S. Pat. 3,532,737.

This invention relates to novel esters and amides of substituted glyoxylic acids and to the preparation thereof.

The compounds of the invention are of the following general formula:

$$R—CO—CO—R' \qquad \text{I}$$

wherein (A) R is lower-alkyl or thienyl; and R' is halo-lower-alkoxy, di-halo-lower-alkoxy, halocycloalkoxy, halo-lower-alkylamino, lower-alkoxy-lower-alkoxy, lower-alkanoyloxy-lower-alkoxy, benzoyloxy-lower-alkoxy, cyano-lower-alkoxy, or di-lower-alkylamino-lower-alkoxy; or (B) R is phenyl, benzyl or naphthyl; and R' is halo-lower-alkylamino, cyano-lower-alkoxy, or di-lower-alkylamino-lower-alkoxy; or (C) acetals of compounds under (A) and (B) derived from lower-alkanols or lower-alkylene-1,- or -1,3-diols.

In the foregoing definitions, the terms "lower-alkyl" and "lower-alkoxy" refer to alkyl or alkoxy groups having from one to six carbon atoms which may be straight or branched, thus including, for example, methyl, ethyl, isopropyl, butyl, hexyl, methoxy, ethoxy, butoxy, and the like. The halogen atoms can be any of the four halogens, fluorine, chlorine, bromine and iodine. The cycloalkyl group has from five to seven ring members and a total of from five to nine carbon atoms, and can be substituted by lower-alkyl groups, thus including, for example, cyclopentyl, cyclohexyl, 4-methylcyclohexyl, cycloheptyl, and the like. The lower-alkanoyl groups are alkanoyl groups having from one to six carbon atoms, thus including, for example, formyl, acetyl, propionyl, valeryl, caproyl, and the like.

The 2-oxo group of the acid moiety of the compounds of Formula I readily forms acetals with lower-alkanols or with lower-alkylene-1,2- or -1,3-glycols.

The compounds of Formula I are prepared by esterification or amidation of the corresponding acids of formula R—CO—OH. Various esterification procedures can be employed including the following:

(1) Reaction of an acid, R—CO—CO—OH, with an alcohol, R"—OH, in the presence of a strong acid, for example, a strong inorganic acid such as sulfuric acid or an organic sulfonic caid such as p-toluenesulfonic acid.

(2) Reaction of an acid halide, R—CO—CO-halide, the halide preferably being chloride or bromide, with an alcohol, R"—OH.

(3) Reaction of a salt of an acid, R—CO—CO—OM, where M is a cation, for example, sodium or potassium, with R"-halide, the halide being chloride, bromide or iodide.

(4) Reaction of an acid, R—CO—CO—OH, with R"-halide, the halide being chloride, bromide or iodide, in the presence of a tertiary amine, for example, triethylamine. Each of the foregoing procedures is preferbaly carried out in an inert organic solvent at a temperature between about 50° C. and 150° C.

In the foregoing processes, R has the meaning given hereinabove under Formula I, and R"O is equivalent to R' in Formula I.

The compounds of Formula I where R' is halo-lower-alklamino can be prepared by reacting an acid halide, R—CO—CO-halide, the halide preferably being chloride or bromide, with an amine R"—NH₂, wherein R" is halo-lower-alkyl.

The compounds of Formula I are useful as plasticizers for resins, especially vinyl-type resins. For example, polyvinyl chloride can be mixed with 30–45% by weight of a compound of Formula I, optionally in the presence of other plasticizers and stabilizers, and a useful resin is thus produced.

The members of a subgroup within the scope of the compounds of Formula I also possess hypoglycemic activity and are therefore useful in lowering high blood sugar concentrations characteristic of diabetic conditions This subgroup is of the Formula I wherein R is lower-alkyl, and R' is halo-lower alkoxy or lower-alkanoyloxy-lower-alkoxy. The terms lower-alkyl, halo-lower-alkoxy and lower-alkanoyloxy-lower-alkoxy have the same meanings as given hereinabove.

The following examples will illustrate the invention without the latter being limited thereby.

EXAMPLE 1

2-chloroethyl phenylglyoxylate [C₆H₅COCOO(CH₂)₂Cl]

A mixture of 15.0 g. of phenylglyoxylic acid, 10.1 ml. of 2-chloroethanol, 1 g. of p-toluenesulfonic acid monohydrate and 60 ml. of ethylene dichloride was refluxed for six and one-half hours. The reaction mixture was poured into water, and the organic layer was separated, washed with water until neutral and dried over anhydrous calcium sulfate. The solution was concentrated to removed the solvent, and the residue was distilled in vacuo to give 17.7 g. of 2-chloroethyl phenylglyoxylate, B.P. 115° C. (0.08 mm.), $n_D^{25}$=1.5360.

EXAMPLE 2

2-chloroethyl pyruvate [CH₃COCOO(CH₂)₂Cl] was prepared from 42.0 g. of pyruvic acid, 43.5 ml. of 2-chloroethanol, 3.9 g. of p-toluenesulfonic acid monohydrate and 170 ml. of ethylene dichloride according to the procedure described above in Example 1. There was obtained tained 40.3 g. of 2-chloroethyl pyruvate, B.P. 105° C. (15 mm.), $n_D^{25}$=1.4440.

Similarly there can be prepared 2-chloroethyl α-ketooctanoate [CH₃(CH₂)₅COCOOCH₂CH₂Cl] (from α-ketooctanoic acid and 2-chloroethanol); 2,2-dichloroethyl pyruvate [CH₃COCOOCH₂CHCl₂] (from pyruvic acid and 2,2-dichloroethanol); 3-bromocyclopentyl pyruvate [CH₃COCOOC₅H₈Br] (from pyruvic acid and 3-bromocyclopentanol); 2-benzoyloxyethyl pyruvate

[CH₃COCOOCH₂CH₂OCOCH₂C₆H₅]

(from pyruvic acid and 2-benzoyloxyethanol); and 2-cyanoethyl pyruvate [CH₃COCOOCH₂CH₂CN] (from pyruvic acid and 2-cyanoethanol).

A mixture of 15.0 g. of 2-chloroethyl pyruvate, 26 ml. of ethyl orthoformate, 1.5 g. of p-toluenesulfonic acid monohydrate and 24 ml. of ethanol was kept at room temperature for two days and then refluxed for eight hours. The solvent was removed in vacuo and the residue poured into water containing 40 ml. of 5% sodium bicarbonate solution and ice. The product was extracted with ethylene dichloride, and the extracts were washed with water until neutral, dried over anhydrous calcium sulfate and concentrated in vacuo to remove the solvent. The residue was distilled in vacuo, and the fraction boiling at 106–113° C. (6 mm.) was resdistilled to give 11.3 g. of 2-chloroethyl pyruvate diethyl acetal, B.P. 109° C. (7 mm.), $n_D^{25} = 1.4362$.

Similarly, from 2-chloroethyl pyruvate and ethylene glycol or 1,3-propylene glycol there can be prepared the ethylene glycol ketal or 1,3-propylene glycol ketal, respectively, of 2-chloroethyl pyruvate.

Starting from the appropriate acids and alcohols and following the procedure of Example 1 above, the following compounds were prepared:

EXAMPLE 3

3 - chloropropyl pyruvate $[CH_3COCOO(CH_2)_3Cl]$, B.P. 131° C. (29 mm.), $n_D^{25} = 1.4466$.

EXAMPLE 4

2-methoxyethyl pyruvate $[CH_3COCOOCH_2CH_2OCH_3]$

B.P. 84° C. (8 mm.), $n_D^{25} = 1.4249$.

EXAMPLE 5

1-chloro-2-propyl pyruvate $[CH_3COCOOCH(CH_3)CH_2Cl]$

B.P. 85° C. (5 mm.), $n_D^{25} = 1.4450$.

EXAMPLE 6

2-cyanoethyl phenylglyoxylate $[C_6H_5COCOOCH_2CH_2CN]$

B.P. 149° C. (0.01 mm.), $n_D^{25} = 1.5304$.

EXAMPLE 7

2 - chloroethyl 2 - thiopheneglyoxylate $[SC_4H_3COCOOCH_2CH_2Cl]$

B.P. 111° C. (0.01 mm.), $n_D^{25} = 1.5708$.

EXAMPLE 8

2-bromoethyl pyruvate $[CH_3COCOOCH_2CH_2Br]$, B.P. 129° C. (27 mm.), $n_D^{25} = 1.4702$.

EXAMPLE 9

2-acetoxyethyl pyruvate $[CH_3COCOOCH_2CH_2OCOCH_3]$

B. P. 72–76° C. (0.03 mm.), $n_D^{25} = 1.4310$.

By procedure similar to those described above there can be prepared 2,2-dichloroethyl 2-thiopheneglyoxylate $[SC_4H_3COCOOCH_2CHCl_2]$ (from 2-thiopheneglyoxylic acid and 2,2-dichloroethanol); 4-chlorocyclohexyl-2-thiopheneglyoxylate $[SC_4H_3COCOOC_6H_{10}Cl]$ (from 2-thiopheneglyoxylic acid and 4-chlorocyclohexanol); 2-methoxyethyl 2-thiopheneglyoxylate $[SC_4H_3COCOOCH_2CH_2OCH_3]$ (from 2-thiopheneglyoxylic acid and 2-methoxyethanol); 2-acetoxyethyl 2-thiopheneglyoxylate $[SC_4H_3COCOOCH_2CH_2OCOCH_3]$ (from 2-thiopheneglyoxylic acid and 2-acetoxyethanol); 2-benzoyloxyethyl 2-thiopheneglyoxylate $[SC_4H_3COCOOCH_2CH_2OCOCH_2C_6H_5]$ (from 2-thiopheneglyoxylic acid and 2-benzoyloxyehtanol); 2-cyanoethyl 2-thiopheneglyoxylate $[SC_4H_3COCOOCH_2CH_2CN]$ (from 2-thiopheneglyoxylic acid and 2-cyanoethanol); 2-cyanoethyl phenylpyruvate $[C_6H_5CH_2COCOOCH_2CH_2CN]$ (from phenylpyruvic acid and 2-cyanoethanol); and 2-cyanoethyl 1-naphthaleneglyoxylate $[C_{10}H_7COCOOCH_2CH_2CN]$ (from 1-naphthaleneglyoxylic acid and 2-cyanoethanol).

EXAMPLE 10

N-(2-chloroethyl)phenylglyoxylamide $[C_6H_5COCONHCH_2CH_2Cl]$

A solution of phenylglyoxylyl chloride (from 30 g. of phenylglyoxylic acid and thionyl chloride) in 100 ml. of ethylene dichloride was added to a stirred solution of 21.8 g. of 2-chloroethylamine hydrochloride in 180 ml. of water. A solution of 16.0 g. of sodium hydroxide in 240 ml. of water was then added gradually over a period of 45 minutes until the pH of the mixture was 6.5–7. The organic layer was separated, washed with water and concentrated to remove the solvent. The residue crystallized to give N - (2 - chloroethyl)phenylglyoxylamide, M.P. 46.4–49.0° C.

Similarly, there can be prepared N-(3-bromopropyl)-pyruvamide $[CH_3COCONH(CH_2)_3Br]$ (from pyruvyl chloride and 3-bromopropylamine hydrochloride); N-(2-chloroethyl) - 2 - thiophenecarboxamide $[SC_4H_3COCONHCH_2CH_2Cl]$ (from 2-thiopheneglyoxylic acid chloride and 2-chloroethylamine hydrochloride); N - (2 - chloroethyl)phenyl-pyruvamide $[C_6H_5CH_2COCONHCH_2CH_2Cl]$ (from phenylpyruvyl chloride and 2-chloroethylamine hydrochloride); and N - (2 - chloroethyl) - 2 - naphthaleneglyoxylamide $[C_{10}H_7COCONHCH_2CH_2Cl]$ from 2-naphthaleneglyoxylic acid chloride and 2-chloroethylamine hydrochloride).

EXAMPLE 11

N-(2-bromoethyl)phenylglyoxylamide $[C_6H_5COCONHCH_2CH_2Br]$

M.P. 63–67° C., was prepared from phenylglyoxylyl chloride and 2-bromoethylamine according to the procedue of Example 10.

EXAMPLE 12

2-dimethylaminoethyl phenylglyoxylate $[C_6H_5COCOOCH_2CH_2N(CH_3)_2]$

To a solution of 76.0 g. of phenylglyoxylic acid in 800 ml. of methyl isobutyl ketone was added 83.0 g. of finely powdered potassium carbonate. The mixture was refluxed for four hours under a water separator. An additional 400 ml. of methyl isobutyl ketone was added, followed by 51.0 g. of 2-dimethylaminoethyl chloride, and the mixture was refluxed for one hour. The reaction mixture was filtered while hot, the removed solid washed with methyl isobutyl ketone, and the combined filtrate and washings concentrated to remove the solvent. The residue was taken up in chloroform, and the solution washed with water, a 1:1 mixture of sodium bicarbonate-sodium chloride solution, again with water, dried over anhydrous calcium sulfate and concentrated. The residue was distilled to give 2-dimethylaminoethyl phenylglyoxylate, B.P. 105° C. (0.04 mm.), $n_D^{25} = 1.5120$. A sample of the base was dissolved in isopropyl alcohol and hydrogen chloride gas was passed through. There was thus obtained 2-dimethylaminoethyl phenylglyoxylate in the form of its hydrochloride salt, M.P. 113–120° C. when recrystallized from isopropyl alcohol.

Similarly, there can be prepared 3-diethylaminopropyl pyruvate $[CH_3COCOOCH_2CH_2CH_2N(C_2H_5)_2]$ (from pyruvic acid and 3-diethylaminopropyl chloride); 2-dimethylaminoethyl 2-thiopheneglyoxylate $[SC_4H_3COCOOCH_2CH_2N(CH_3)_2]$ (from 2-thiopheneglyoxylic acid and 2-dimethylaminoethyl chloride), 2-dimethylaminoethyl phenylpyruvate

[C₆H₅CH₂COCOOCH₂CH₂N(CH₃)₂]

(from phenylpyruvic acid and 2-dimethylaminoethyl chloride); and 2-dimethylaminoethyl 2-naphthaleneglyoxylate [C₁₀H₇COCOOCH₂CH₂N(CH₃)₂] (from 2-naphthaleneglyoxylic acid and 2-dimethylaminoethyl chloride).

EXAMPLE 13

Cyanomethyl phenylglyoxylate [C₆H₅COCOOCH₂CN]

To a solution of 25.5 g. of phenylglyoxylic acid and 23.5 ml. of triethylamine in 100 ml. of dimethylformamide was added 12.7 g. of chloroacetonitrile over a period of five minutes. The reaction mixture was stirred on a steam bath for five hours, then cooled and filtered. The filtrate was poured into water and the product extracted with chloroform. The extracts were washed with water and sodium bicarbonate solution, dried over anhydrous calcium sulfate and concentrated to remove the solvent. The residue was distilled to give 17 g. of cyanomethyl phenylglyoxylate, B.P. 123° C. (0.02 mm.), $n_D^{25}$=1.5360.

I claim:
1. A compound selected from the group consisting of compounds of the formula R—CO—CO—R' wherein R is lower-alkyl and R' is halo-lower-alkoxy.
2. 2-chloroethyl pyruvate, according to claim 1.
3. 3-chloropropyl pyruvate, according to claim 1.
4. 1-chloro-2-propyl pyruvate, according to claim 1.

References Cited

Chem. Abstracts, 51:2039g, 64:6842e, 67:17640.

JAMES A. PATTEN, Primary Examiner

V. GARNER, Assistant Examiner

U.S. Cl. X.R.

260—30.2, 30.4 R, 31.4 R, 31.6, 32.2, 332.2 A, 340.7, 340.9, 408, 465 D, 465.4, 469, 473 A, 476 R, 477, 484 R, 558 R, 561 B, 561 K; 424—311

UNITED STATES PATENT OFFICE
CERTIFICATE OF CORRECTION

Patent No. 3,657,325                  Dated     April 18, 1972

Inventor(s)   James E. Siggins

It is certified that error appears in the above-identified patent and that said Letters Patent are hereby corrected as shown below:

Column 1, line 37, "-1,-" should read -- -1,2- --; line 65, "caid" should read --acid--.

Column 3, line 57, "4-chlorocyclonexanol" should read --4-chlorocyclohexanol--; line 70, "ehtanol" should read --ethanol--.

Signed and sealed this 27th day of March 1973.

(SEAL)
Attest:

EDWARD M. FLETCHER, JR.                 ROBERT GOTTSCHALK
Attesting Officer                        Commissioner of Patents